No. 880,921. PATENTED MAR. 3, 1908.
C. ROSENBERG.
ROLLER SKATE.
APPLICATION FILED SEPT. 27, 1907.
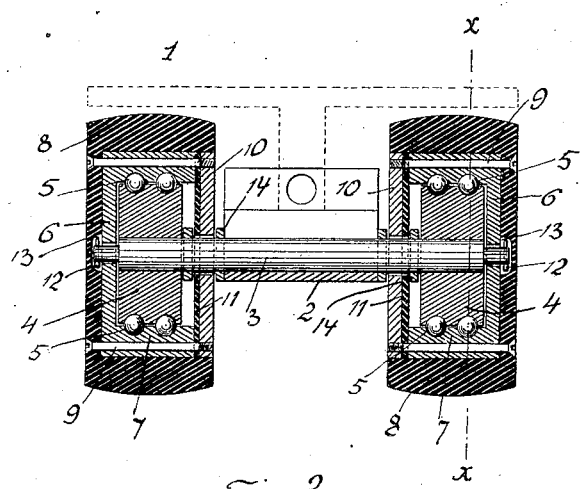
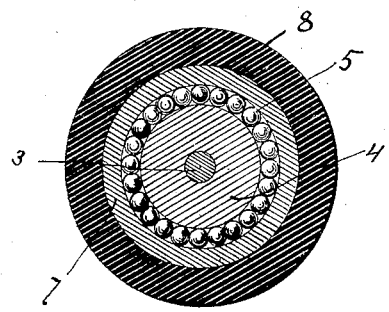
Inventor
Carl Rosenberg,
Witnesses
A. H. Rabsag,
Max H. Siolowitz
By
Attorneys

UNITED STATES PATENT OFFICE.

CARL ROSENBERG, OF EAST PITTSBURG, PENNSYLVANIA.

ROLLER-SKATE.

No. 880,921.   Specification of Letters Patent.   Patented March 3, 1908.

Application filed September 27, 1907. Serial No. 394,822.

*To all whom it may concern:*

Be it known that I, CARL ROSENBERG, a subject of the Czar of Russia, residing at East Pittsburg, in the county of Allegheny and State of Pennsylvania, have invented certain new and useful Improvements in Roller-Skates, of which the following is a specification, reference being had therein to the accompanying drawing.

This invention relates to roller skates, and its object is to provide a skate which will be practically noiseless in operation.

The invention comprises rollers mounted upon a suitable shaft, casings inclosing said rollers, anti-friction balls interposed between said casings and rollers, and yielding tires surrounding said casings and rollers.

The construction of the improvement will be fully described hereinafter in connection with the accompanying drawing which forms a part of this specification, and its features of novelty will be set forth in the appended claims.

In the drawing:—Figure 1 is a sectional view taken through two of the skate rollers, Fig. 2 is a vertical section on the line $x$—$x$ of Fig. 1.

The reference numeral 1 designates the sole plate of the skate from which depends a bearing 2 for the roller shaft 3. It will be understood that two pairs of rollers and two shafts will be employed, but as both sets of rollers, and both shafts are of similar construction a description of one pair of rollers and one shaft will suffice.

The numeral 4 designates rollers mounted upon the shaft 3, and formed with peripheral grooves to receive anti friction balls 5. Surrounding each of the rollers 4 is a cup-shaped casing comprising a disk 6, and an annular horizontal flange 7, said flange 7 being formed with grooves to receive the anti friction balls 5. Each of the casings 6 is inclosed by a rubber cover 8, said covers serving as yielding tires and being secured to the casings 6 by screws 9 which also extend through disks 10, said disks closing the inner sides of the casings 6. Rubber gaskets 11 are interposed between the inner sides of the casings 6 and the disks 10. The inner sides of the cover 8 are recessed, as shown at 12 to accommodate the linch pins 12 of the shaft 3. The rollers 4 are spaced away from the gaskets 11 by washers 14. It will be apparent that by the construction as thus described the skate rollers are provided with yielding and noiseless tread surfaces and that the ball bearings 5 reduce the friction to the minimum to contribute to the easy revolution of the rollers and their noiseless action.

Having fully described my invention what I claim and desire to secure by Letters Patent is, 1. In a roller skate the combination with a shouldered axle, of a roller fixedly mounted thereon near each end and formed with peripheral grooves, a cup-shaped casing mounted against each of the shoulders of the shaft and inclosing said rollers, said casings provided with interiorly arranged grooves opposing the grooves of the rollers, bearing balls interposed between the casings and rollers and mounted in said grooves, a resilient covering for said casings, means to prevent the longitudinal movement of rollers with respect to the axle, and means for securing said resilient coverings to the casings.

2. In a roller skate the combination with a shouldered axle, of a roller fixedly mounted thereon near each end and formed with peripheral grooves, a cup-shaped casing mounted against each of the shoulders of the shaft and inclosing said rollers, said casings provided with interiorly arranged grooves opposing the grooves of the rollers, bearing balls interposed between the casings and rollers and mounted in said grooves, disks mounted upon the axles and abutting against the inner sides of the casings, means to prevent said rollers from shifting longitudinally upon the axle, resilient coverings for the casings and peripheries of the disks, and means for securing the coverings to the casings and disks.

3. In a roller skate the combination with an axle, of rollers fixedly mounted thereon and provided with peripheral grooves, a casing inclosing each of said rollers and provided with interiorly arranged grooves, bearing balls interposed between the rollers and casings and seated in the grooves, a resilient covering inclosing each of said casings, a disk mounted in each of the coverings and upon the axle, means for securing the disk to the casing, a flexible gasket interposed between the disks and casing and means for securing the cover to the casing and disk.

In testimony whereof I affix my signature in the presence of two witnesses.

CARL ROSENBERG.

Witnesses:
MAX H. SROLOVITZ,
ED. B. STEINFELD.